United States Patent [19]

Takahashi

[11] Patent Number: 5,732,408
[45] Date of Patent: Mar. 24, 1998

[54] CONTROL SYSTEM FOR CONTROLLING THE PENDING DATA TO WRITE BACK IN A CACHE STORAGE UNIT

[75] Inventor: Hidehisa Takahashi, Kawasaki, Japan

[73] Assignee: Fujitsu Limited, Kawasaki, Japan

[21] Appl. No.: 312,986

[22] Filed: Oct. 3, 1994

Related U.S. Application Data

[63] Continuation of Ser. No. 776,054, Oct. 15, 1991, abandoned.

[30] Foreign Application Priority Data

Oct. 15, 1990 [JP] Japan ................................. 2-275619

[51] Int. Cl.⁶ ...................................................... G06F 13/00
[52] U.S. Cl. ..................... 711/113; 395/182.04; 711/112
[58] Field of Search ........................... 395/439, 182.04, 395/182.03; 711/112, 113

[56] References Cited

U.S. PATENT DOCUMENTS

| | | | |
|---|---|---|---|
| H1221 | 8/1993 | Best et al. .............................. | 360/97.01 |
| 4,101,969 | 7/1978 | Lawson et al. ......................... | 395/439 |
| 4,916,605 | 4/1990 | Beardsley et al. ..................... | 395/483 |
| 5,051,887 | 9/1991 | Berger et al. .......................... | 395/389 |
| 5,247,640 | 9/1993 | Maehara ................................. | 395/439 |
| 5,274,799 | 12/1993 | Brant et al. ........................... | 395/182.04 |

*Primary Examiner*—David L. Robertson
*Attorney, Agent, or Firm*—Armstrong, Westerman, Hattori, McLeland & Naughton

[57] ABSTRACT

A control system controls a cache storage unit including a nonvolatile memory, the cache storage unit being provided in a data processing system having a host computer and an auxiliary storage unit. The control system includes a first writing function block for writing updated data, which is updated in the cache storage unit by the host computer, in the nonvolatile memory, a determining function block for determining whether or not the auxiliary storage unit is in a ready state where data can be stored in the auxiliary storage unit, a detecting function block for detecting the restoring of the auxiliary storage unit when the determining function block determines that the auxiliary storage unit is not in the ready state, and second writing function block for writing in the auxiliary storage unit the updated data which has been maintained in the nonvolatile memory.

17 Claims, 8 Drawing Sheets

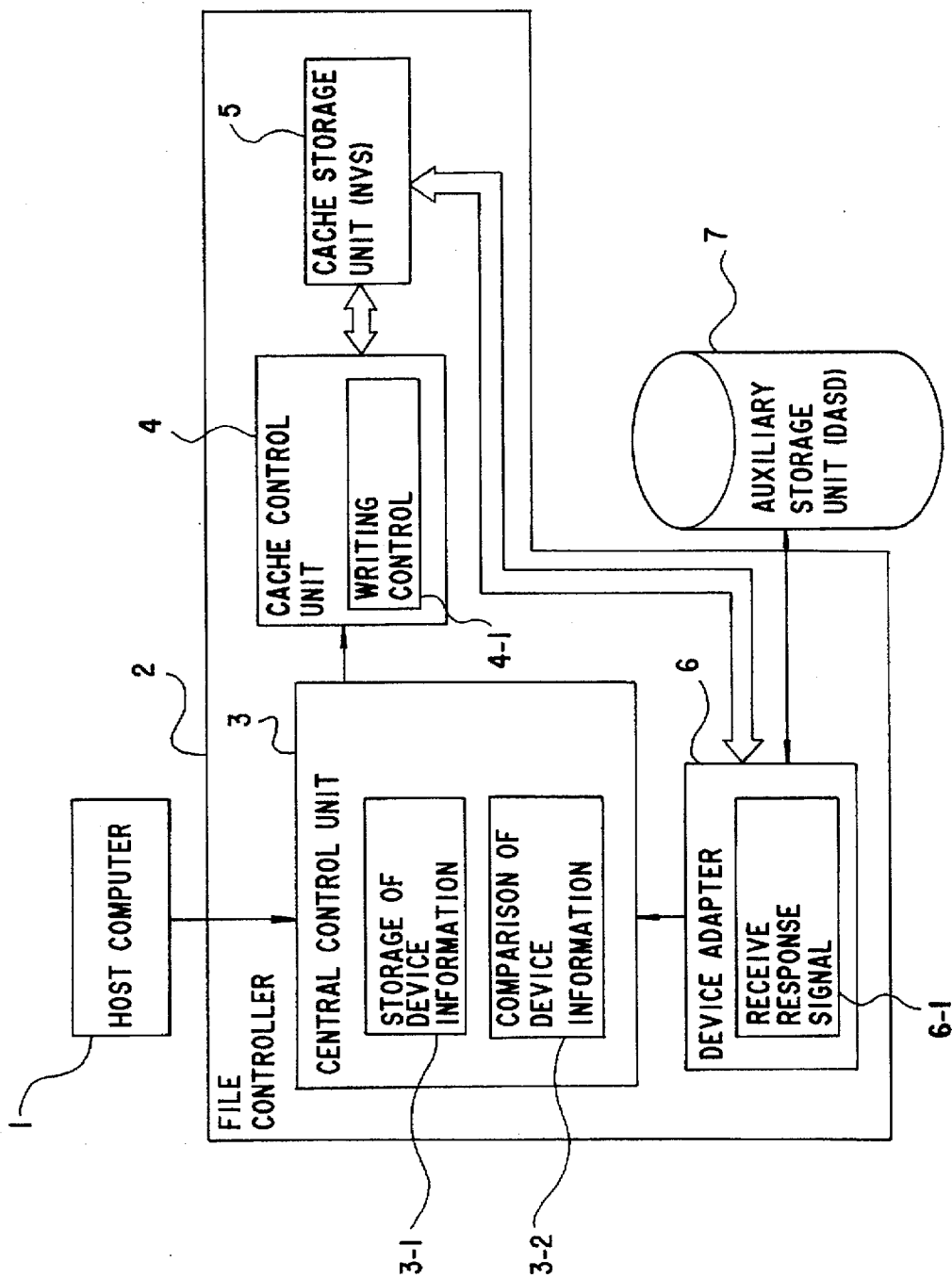

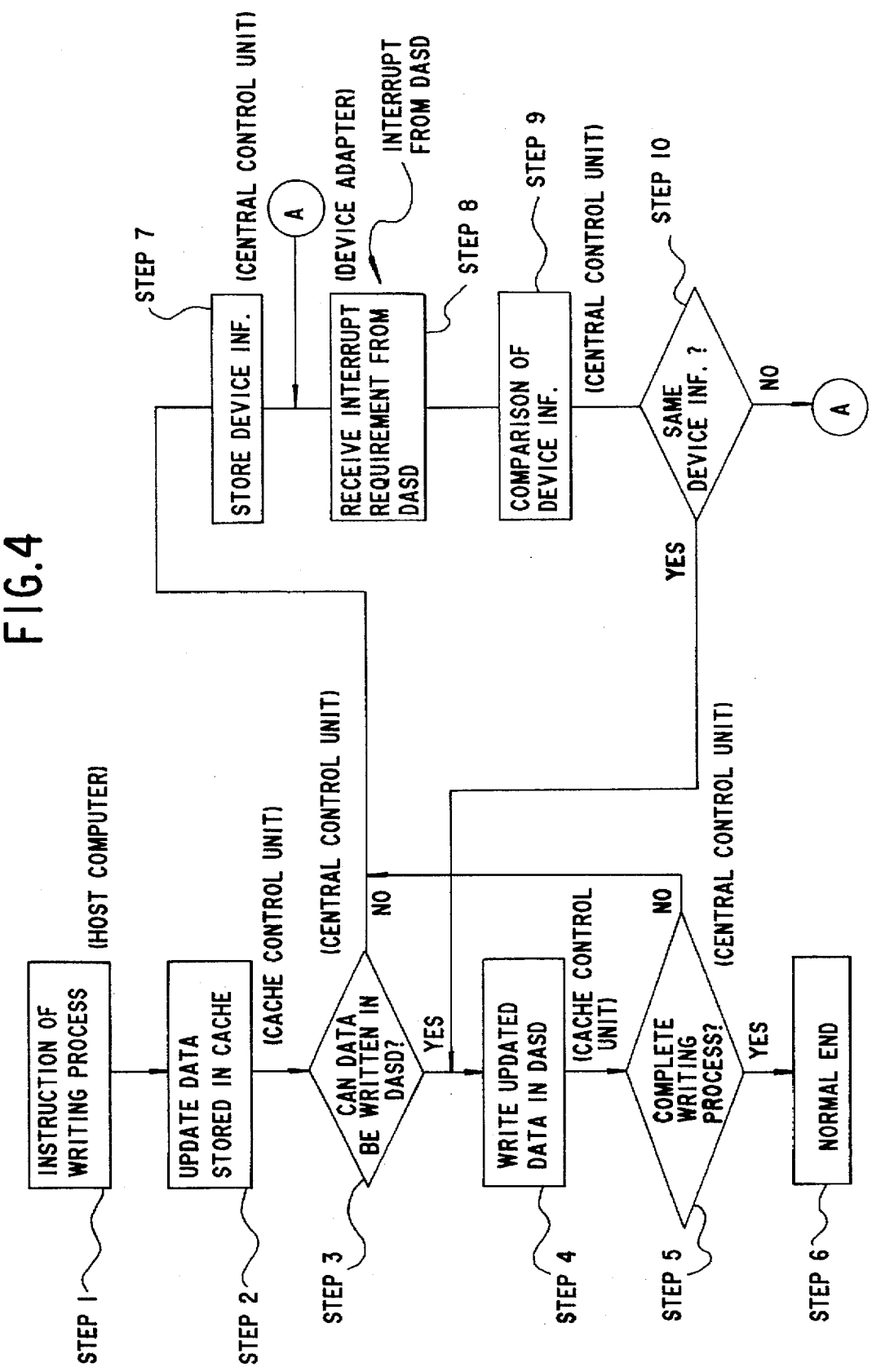

5,732,408

CONTROL SYSTEM FOR CONTROLLING THE PENDING DATA TO WRITE BACK IN A CACHE STORAGE UNIT

This application is a continuation of application Ser. No. 07/776,054 filed Oct. 15, 1991, now abandoned.

BACKGROUND OF THE INVENTION (1) Field of the invention

The present invention generally relates to a control system for controlling a cache storage unit, and more particularly to a control system for controlling a cache storage unit having nonvolatile storage means, in a data processing system having an auxiliary storage unit.

(2) Description of related art

A data processing system having a host computer, an auxiliary storage unit (for example, a DASD (Direct Access Storage Device, i.e., a magnetic disk unit), and a cache storage unit has been proposed. In a case where the host computer in the above data processing system updates data stored in the auxiliary storage unit, if the same data has been stored in the cache storage unit, the data read out from the cache storage unit is updated, and then the updated data is stored, in place of original data, in both the cache storage unit and the auxiliary storage unit. Thus, the same data as that in the cache storage unit is always maintained in the auxiliary storage unit.

A conventional data processing system having a cache storage unit which includes a nonvolatile memory is shown in FIG. 1. Referring to FIG. 1, a data processing system has a host computer 71, a file controller 72, and a DASD 73. The file controller 72 has a cache storage unit formed of a nonvolatile cache memory 74 and a volatile cache memory 75. The capacity of the nonvolatile cache memory 74 is less than that of the volatile cache memory 75. In this data processing system, when data stored in the DASD 73 is updated, updated data supplied from the host computer 71 to the file controller 72 is written in both the nonvolatile cache memory 74 and the volatile cache memory 75. When the updated data is written in the cache storage unit, the host computer 71 determines that a process for updating the data stored in the DASD 73 is completed. After that, the file controller 72 stores, in place of original data, the updated data which has been stored in the nonvolatile cache memory 74 in the DASD 73. In accordance with the above procedure, the data stored in the DASD 73 is then updated.

According to the above system, as the cache storage unit includes the nonvolatile memory 74, even if a power supply of the system is cut off, the updated data can be maintained in the nonvolatile memory 74. Thus, after the power supply of the system has been restored, the updated data stored in the nonvolatile memory 74 can be used in the system. More particularly, the data stored in the DASD 73 can be changed to the updated data stored in the nonvolatile memory 74 so that the data stored in the DASD 73 is updated.

The data processing system having the cache storage unit which includes the nonvolatile memory is disclosed in Japanese Patent Laid Open Publication Nos.63-148348, 64-64047, 64-76344 and 64-76346. However, a process used in a case where the DASD cannot be accessed, such as a case where the power supply of the system is cut off, or a case where the DASD has a trouble, is not concretely disclosed in the above references.

Thus, the inventor of the present invention can propose a process for storing the updated data supplied from the host computer in the DASD, as shown in FIG. 2.

Referring to FIG. 2, when a process for updating the data stored in the DASD 73 is activated in step 1, the host computer 71 stores the updated data in both the nonvolatile memory 74 and the volatile memory 75 in step 2. When step 2 is completed, the host computer 71 determines that the data stored in the DASD 73 is updated. After that, the file controller 72 determines whether or not data can be written in the DASD 73, in step 3. In step 3, the file controller 72 commands the DASD 73 to store the updated data which has been stored in the nonvolatile memory 74 in step 2 and waits for a response from the DASD 73. When a response indicating that data can be written in the DASD 73 is supplied from the DASD 73, the file controller 72 transmits to the DASD 73 the updated data which has been stored in the nonvolatile memory 74 in step 4. Then, the updated data is stored in the DASD 73 in place of the original data.

On the other hand, when a trouble occurs in the DASD 73, the file controller 72 determines that the data cannot be written in the DASD 73 in step 3. In this case, a process for storing the updated data in the DASD 73 is deferred, in step 5. Then, after the DASD 73 is restored, an operator inputs an instruction to restart the process for storing the updated data in the DASD 73 via an operation unit such as a key board, in step 6. When the instruction to restart the process is supplied to the file controller 72, the file controller 72 transmits the updated data from the nonvolatile memory 74 to the DASD 73, in step 6, so that the updated data is stored in the DASD 73 in place of the original data.

In the above system for carrying out the process shown in FIG. 2, when the DASD 73 which has had a trouble is restored, the process for storing the updated data in the DATA 73 is restarted by an operation of the operator.

SUMMARY OF THE PRESENT INVENTION

Accordingly, a general object of the present invention is to provide a novel and useful control system for controlling a cache storage unit in which the disadvantages of the prior art are eliminated.

A more specific object of the present invention is to provide a control system for controlling a cache storage unit in which when an auxiliary storage unit which has had a trouble is restored, updated data which has been maintained in the cache storage unit can be automatically read out from the cache storage unit and written in the auxiliary storage memory.

The above objects of the present invention are achieved by a control system for controlling a cache storage unit including a nonvolatile memory, the cache storage unit being provided in a data processing system having a host computer and an auxiliary storage unit, the control system comprising: a first writing device, coupled to the host computer and the cache storage unit, for writing updated data, which is updated in the cache storage unit by the host computer, in the nonvolatile memory; determining means, coupled to the auxiliary storage unit, for determining whether or not the auxiliary storage unit is in a ready state where data can be stored in the auxiliary storage unit; detecting device, coupled to the auxiliary storage unit, for detecting restoring of the auxiliary storage unit when the determining device determines that the auxiliary storage unit is not in the ready state; and second writing device, coupled to the detecting device, the nonvolatile memory and the auxiliary storage unit, for writing in the auxiliary storage unit the updated data which has been maintained in the nonvolatile memory.

According to the present invention, when the detecting device detects the restoring of the auxiliary storage unit, the second device writes in the auxiliary storage unit the updated data which has been maintained in the nonvolatile memory. Thus, even if there is a state in which the data cannot be stored in the auxiliary storage unit, the updated data which has been maintained in the nonvolatile memory can be automatically written in the auxiliary storage unit when the auxiliary storage unit is restored. As a result, the data processing system having the control system according to the present invention can be efficiently operated.

Additional objects, features and advantages of the present invention will become apparent from the following detailed description when read in conjunction with the accompanying drawings.

BRIEF DESCRIPTION OF THE DRAWINGS

FIG. 3 is a block diagram illustrating a basic structure of a data processing system including a control system for controlling a cache storage unit according to the present invention.

FIG. 4 is a flow chart illustrating a process carried out in the data processing system shown in FIG. 3.

DESCRIPTION OF THE PREFERRED EMBODIMENT

Figure 2:
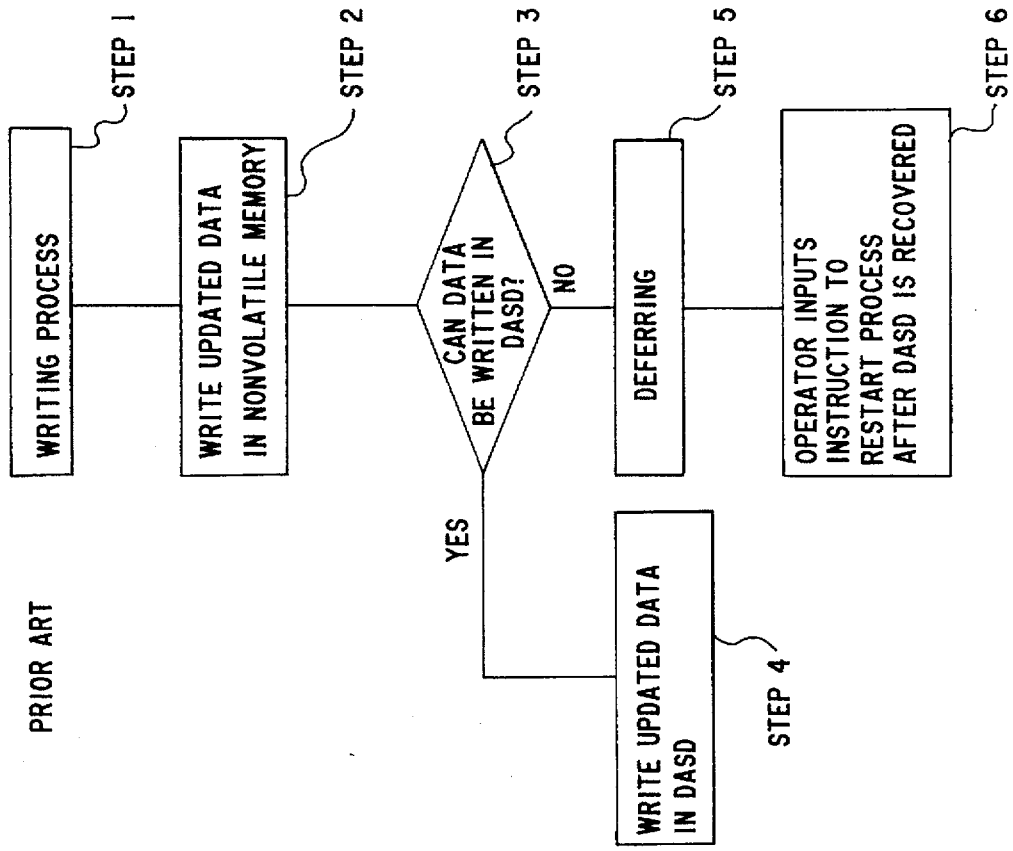
FIG. 2 is a flow chart illustrating a process for updating the data stored in the DASD which has been proposed by the inventor of the present invention.
Figure 1:
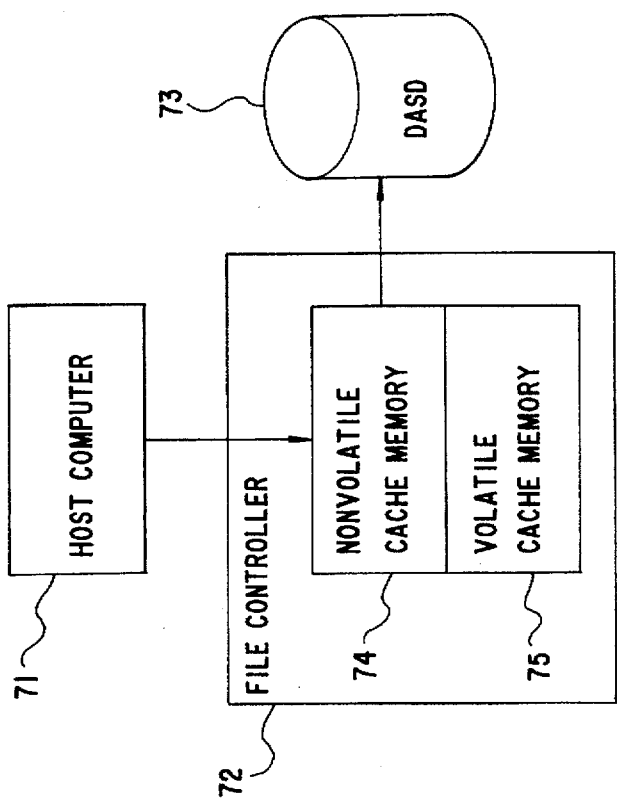
FIG. 1 is a block diagram illustrating a conventional data processing system.

A description will now be given of the principle of the present invention with reference to FIGS. 3 and 4.

Referring to FIG. 3, a data processing system has a host computer 1, a file controller 2, and an auxiliary storage unit 7 such as a DASD. The file controller 2 has a central control unit 3, a cache control unit 4, a cache storage unit 5 including a nonvolatile memory, and a device adapter 6. The file controller 2 carries out a process for writing updated data supplied from the host computer 1 in the cache storage unit 5 and a process for writing the updated data maintained in the cache storage unit 5 in the auxiliary storage unit 7. The central control unit 3 controls the cache control unit 4. The central control unit 3 maintains device information including a device-number identifying the auxiliary storage unit 7 and an adapter-number identifying the device adapter 6 connected to the auxiliary storage unit 7 identified by the device-number (3-1). The central control unit 3 determines whether or not the device information maintained therein is the same as that of the auxiliary storage unit 7 which outputs a response signal indicating that the auxiliary storage unit is capable of storing the data (3-2). Then, when the central control unit 3 determines that the device information maintained therein is the same as that of the auxiliary storage unit 7, the central control unit 3 supplies an instruction to the cache control unit 4 to write the updated data in the auxiliary storage unit 7. The cache control unit 4 carries out a control process (4-1) for writing the updated data which has been maintained in the nonvolatile memory of the cache storage unit 5 in the auxiliary storage unit 7, and so on. The auxiliary storage unit 7 is operatively connected to the central control unit 3 and the cache control unit 4 via the device adapter 6. The device adapter receives the response signal (6-1) indicating that the auxiliary storage unit is capable of storing the data.

The above data processing system carries out a process for updating the data stored in the auxiliary storage unit 7 in accordance with a flow chart shown in FIG. 4.

Referring to FIG. 4, the host computer 1 instructs the file controller 2 to update the data stored in the auxiliary storage unit 7, in step 1. The cache control unit 4 updates the data which has been maintained in the cache storage unit 5 in accordance with an instruction of the central control unit 3, in step 2. The central control unit 3 controls the device adapter 6 so that the device adapter 6 transmits an inquiry signal indicating whether or not the auxiliary storage unit 7 is capable of storing the updated data to the auxiliary storage unit 7. The central control unit 3 determines whether or not the auxiliary storage unit 7 is capable of storing the updated data based on a response signal against the above inquiry signal, in step 3. When the central control unit 3 determines that the auxiliary storage unit 7 is capable of storing the updated data in step 3, the cache control unit 4 writes in the auxiliary storage unit 7 the updated data which has been maintained in the nonvolatile memory of the cache storage unit 5, in step 4, in accordance with an instruction supplied from the central control unit 3. Then the central control unit 3 determines whether or not the process in step 4 has been completed, in step 5. When the central control unit 3 determines that the process in step 4 has been completed based on an end signal transmitted from the auxiliary storage unit 7, the central control unit 3 informs the host computer 1 that the process for updating the data stored in the auxiliary storage unit 7 is normally completed, in step 6.

On the other hand, when the central control unit 3 determines that the auxiliary storage unit 7 is not capable of storing the updated data, in step 3, such as in a case where a power supply of the auxiliary storage unit 7 is cut off, the central control unit 3 maintains the device information including the device-number identifying the auxiliary storage unit 7 which is not capable of storing the updated data and the adapter-number identifying the device adapter connected to the auxiliary storage unit 7, in step 7. Then the central control unit 3 carries out other processes while waiting for an interruption requirement from the auxiliary storage unit 7. When the auxiliary storage unit 7 is restored, the auxiliary storage unit 7 supplies an interruption requirement to the central control unit 3 via the device adapter 6. When the device adapter 6 receives an interruption signal indicating that the auxiliary storage unit is restored so that it is able to store the updated data along with device information identifying the auxiliary storage unit, in step 8, the central control unit 3 compares the device information which has been maintained therein with that supplied in step 8. If the central control unit 3 determines, in step 10, that the device information which has been maintained therein is the same as that supplied in step 8, the processes in steps 4, 5 and 6 are sequentially carried out. In step 10, if the central control unit 3 determines that the device information is not the same as that supplied in step 8, the central control unit 3 continuously carries out the other processes while waiting for the interruption requirement from the auxiliary storage unit 7.

A description will now be given of an embodiment of the present invention.

Figure 5A:
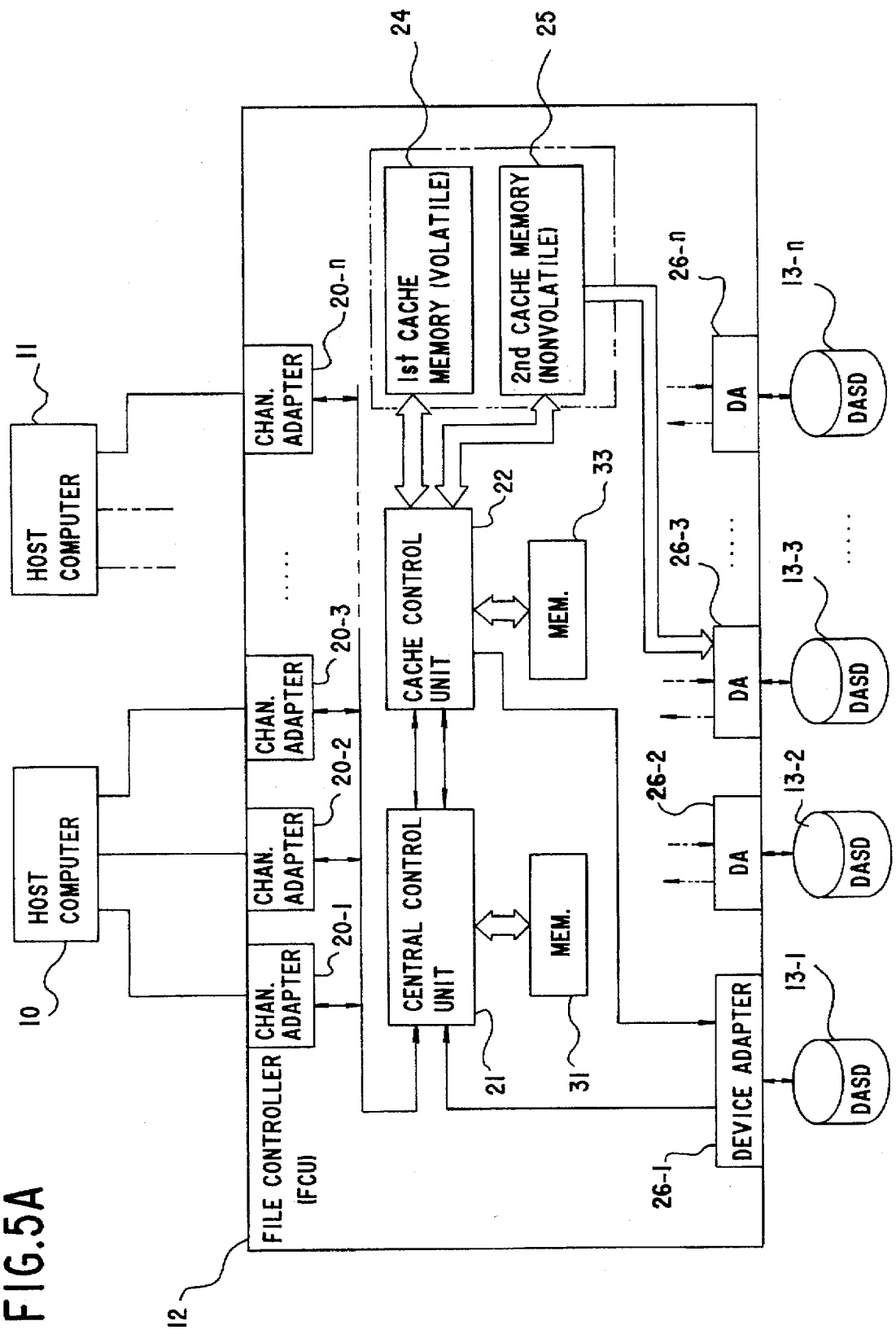
FIG. 5A is a block diagram illustrating the data processing system according to an embodiment of the present invention.

Referring to FIG. 5A, which shows a data processing system according to an embodiment of the present invention, this data processing system has two host computers 10 and 11, a file controller (FCU) 12, and a plurality of DASDs (magnetic disk units) 13-1 through 13-n. Each of the host computers 10 and 11 can control each of the DASDs 13-1 through 13-n via the file controller 12. The file controller 12 has a plurality of channel adapters 20-1 through 20-n, a central control unit 21, a memory 31 connected to the central control unit 21, a cache control unit 22, a memory 33 connected to the cache control unit 22, a cache storage unit including a first cache memory 24 formed of a volatile memory such as an SRAM or a DRAM, a second cache memory 25 formed of a nonvolatile memory, and a plurality of device adapters 26-1 through 26-n. The host computers 10 and 11 are operatively connected via the channel adapters 20-1 through 20-n to the central control unit 21. The DASDs 13-1 through 13-n are operatively connected via the device adapters 26-1 through 26-n to the central control unit 21 and the cache control unit 22. The cache control unit 22 controls both the first cache memory 24 and the second cache memory 25 in accordance with an instruction from the central control unit 21. Each of the device adapters 26-1 through 26-n is formed as shown in FIG. 5B.

Figure 5B:
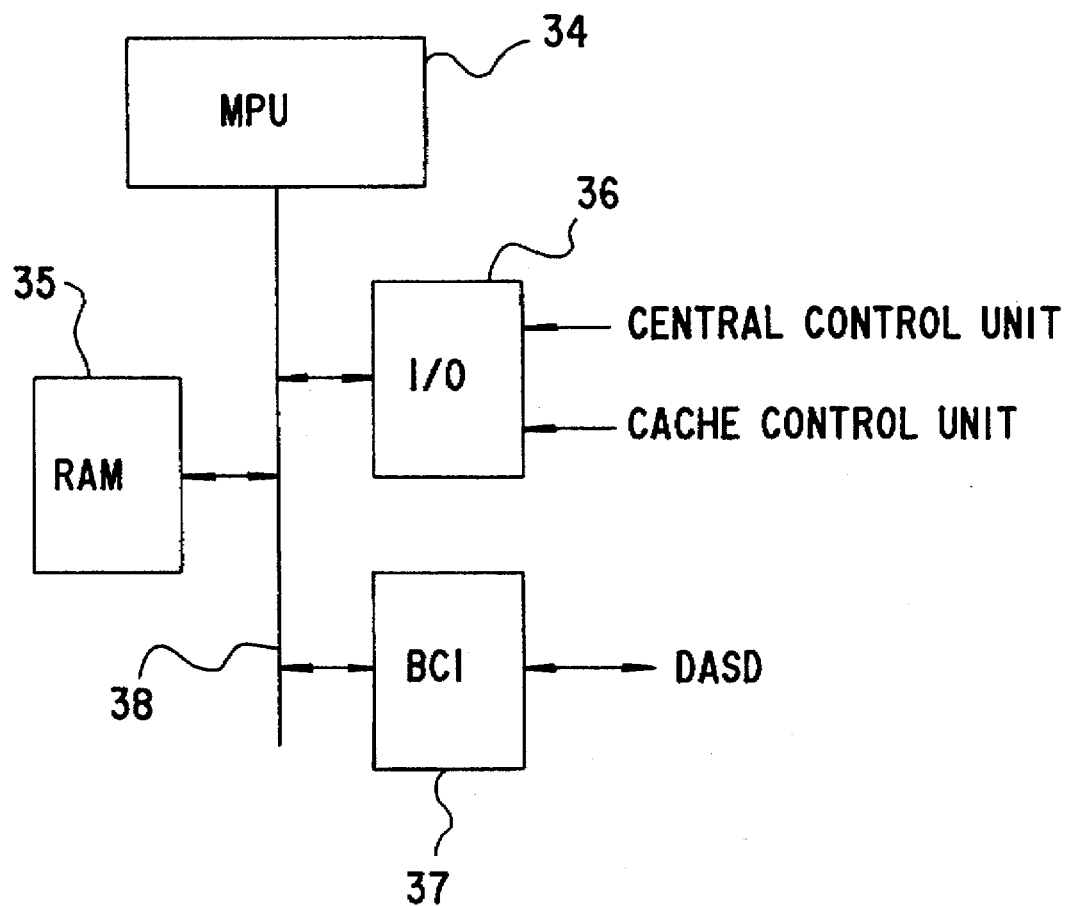
FIG. 5B is a block diagram illustrating a device adapter shown in FIG. 5A.

Referring to FIG. 5B, a device adapter has an MPU 34, a RAM 35, an I/O interface 36, and a BCI interface 37 which are connected by an internal bus 38 to each other. The I/O interface 36 is coupled to the central control unit 21 and the cache control unit 22. The BCI interface 36 is coupled to a corresponding DASD.

The updated data maintained in the second cache memory 25 (the nonvolatile memory) cannot be written in the DASD in the following cases (1)–(4) where:

(1) power supply devices of the central control unit 21 and DASD are cut off after the updated data is stored in the second cache memory 25;

(2) a cable connecting the file controller 12 and the DASD is disconnected so that the updated data cannot be transmitted from the file controller 12 to the DASD;

(3) the DASD is not in the ready condition when the central control unit 21 writes the updated data in the DASD; and (4) a system down occurs owing to a power supply failure.

A control process in the file controller 12 according to the present invention is carried out when the DASD which has been in one of the above cases is restored.

Figure 6:
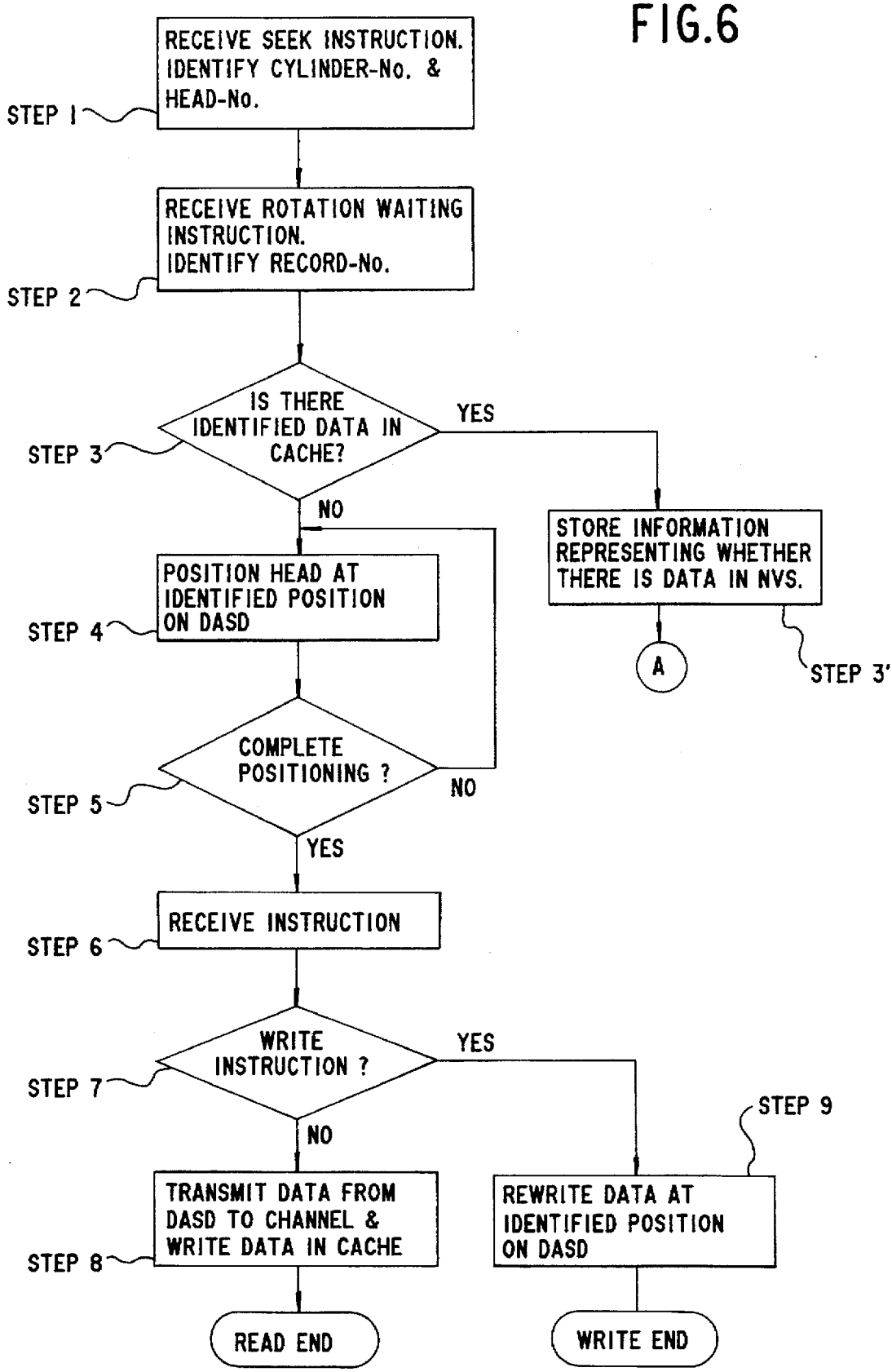
FIGS. 6 through 8 are flow charts illustrating processes carried out in the data processing system shown in FIG. 5A.
Figure 7:
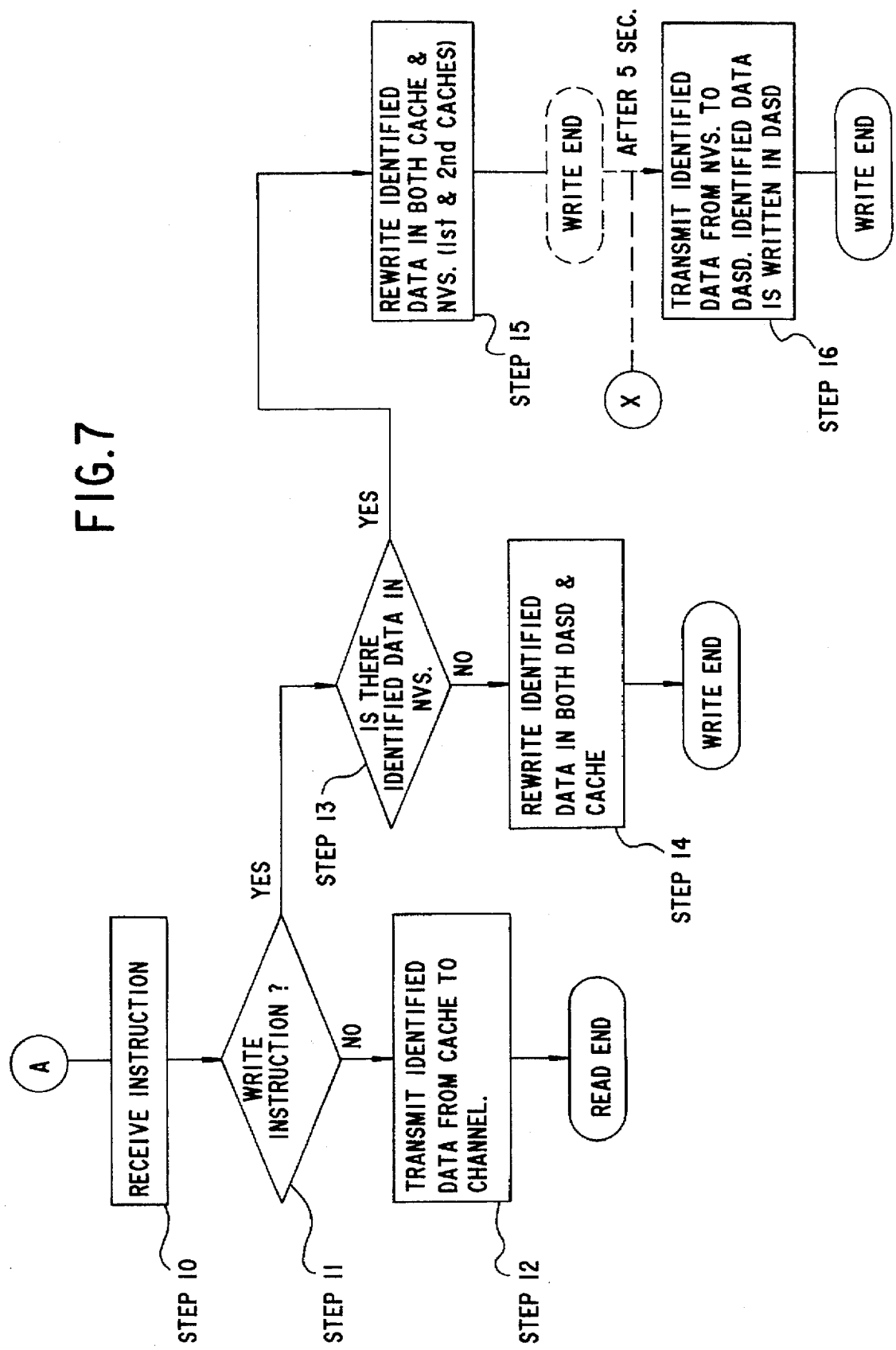
Figure 8:
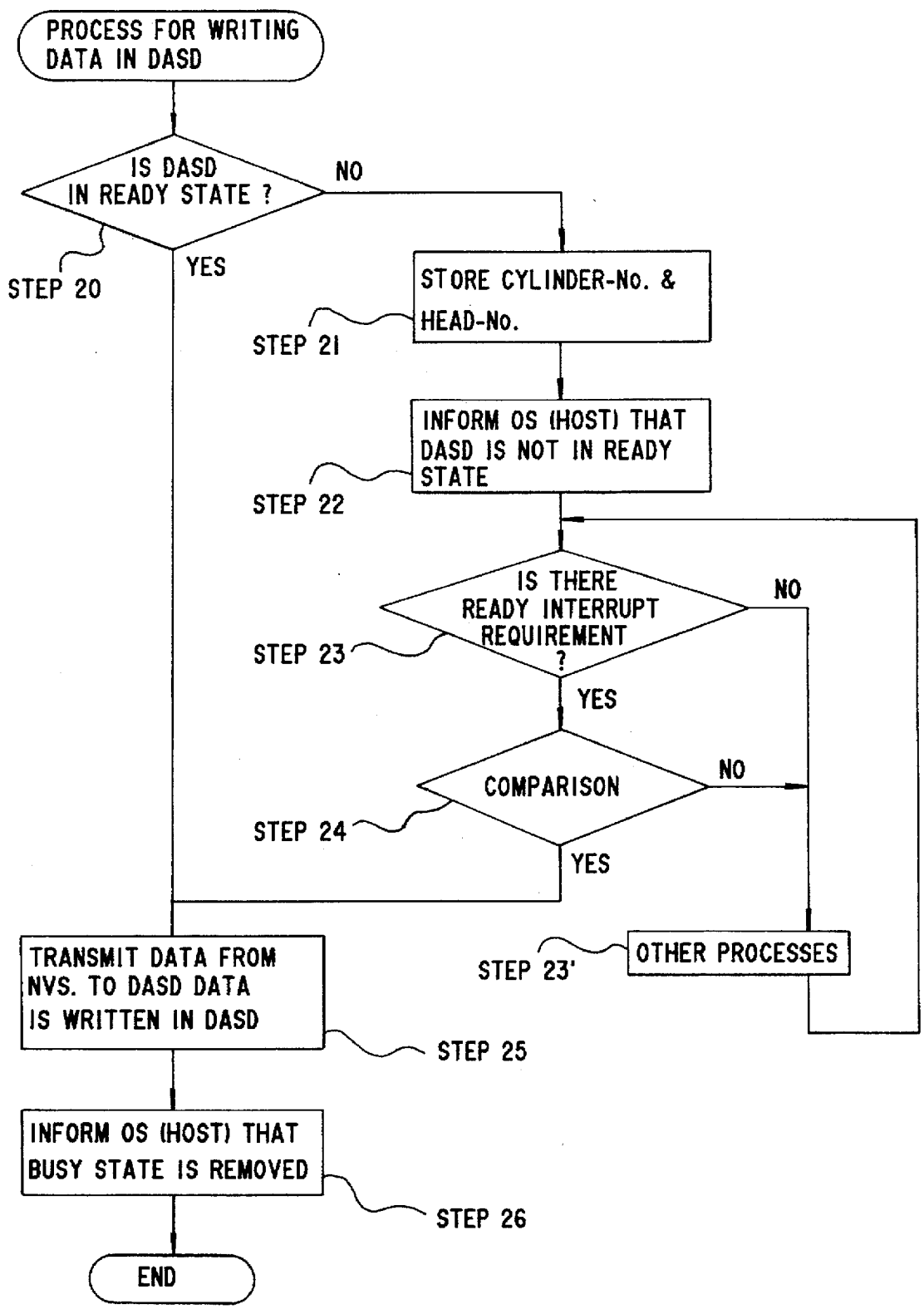

The data processing system shown in FIGS. 5A and 5B carries out processes in accordance with flow charts shown in FIGS. 6 through 8.

A process in accordance with the flow chart shown in FIG. 6 is carried out to access a DASD in a case where a cylinder-number and a head-number which are supplied from the host computer 10 or 11 are not in the first cache memory 24.

A description will now be given of a process in a case where the host computer 10 accesses the DASD 13-1 with respect to FIG. 6.

Referring to FIG. 6, the central control unit 21 of the file controller 12 receives a seek instruction from the host computer 10 via the channel adapter 20-1, in step 1. In the seek instruction, the cylinder-number and the head-number are respectively identified. Then the central control unit 21 receives a rotation waiting instruction (searching) via the channel adapter 20-1 in step 2. In this instruction, a record-number is identified. The central control unit 21 determines whether or not the same data as that stored, in the DASD 13-1, at a position corresponding to the cylinder-number and the head-number which are supplied to the host computer 10 is in the first cache memory 24, in step 3. If the result obtained in step 3 is NO, the process proceeds to step 4. In step 4, the head is positioned at a record, which is identified by the instruction from the host computer 10, in the DASD. Then, the central control unit 21 determines whether or not the head is completely placed at the record, in step 5. If the result in step 5 is YES, the central control unit 21 receives an input-output instruction supplied from the host computer 10 in step 6, and determines whether the input-output instruction is a read instruction or write instruction in step 7. When the central control unit 21 determines that the read instruction is supplied from the host computer 10, a read process is carried out in step 8. In the read process in step 8, the central control unit 21 transmits data of the record at an identified position to the host computer 10 via the channel adapter 20-1. At the same time, the central control unit 21 controls the cache control unit 22 so that all data in a track on which the identified record exists is written in both the first cache memory 24 (the volatile memory) and the second cache memory 25 (the nonvolatile memory). At this time, the device-number, the cylinder-number and the head-number, which correspond to all the data written in the first and second cache memories 24 and 25, are written in the memory 33 of the cache control unit 22. When the data has been completely written in the first and second cache memories 24 and 25 in step 8, the read process is completed.

When the central control unit 21 determines that the write instruction has been supplied from the host computer 10 in step 7, a write process is carried out in step 9. In the write process in step 9, the data of the record which is identified by the instruction from the host computer 10 is rewritten. After the data is rewritten in step 9, the write process is completed.

On the other hand, when the central control unit 21 determines that the same data as that stored at a position identified by the cylinder-number and the head-number in the DASD is maintained in the cache storage unit in step 3, the process proceeds to step 3'. In step 3', information representing whether or not the same data as that stored in the DASD is maintained in the second cache memory 25 (the nonvolatile memory) is stored in the memory 33 connected to the cache control unit 22. The process then proceeds from step 3' to step 10 shown in FIG. 7.

The central control unit 21 receives the next instruction from the host computer 10, in step 10. Then, the central control unit 21 determines whether the next instruction is the read instruction or the write instruction, in step 11. When the central control unit 21 determines that the read instruction is supplied from the host computer 21, the central control unit 21 controls the cache control unit 22 so that the same data as that of the record at the identified position in the DASD is transmitted from the first cache memory 24 to the channel adapter 20-1, in step 12. When step 12 is completed, the process based on the read instruction from the host computer 10 is completed.

When the central control unit 21 determines the write instruction has been supplied from the host computer 10, in step 11, the central control unit 21 determines whether or no the same data as that stored at the position identified by the cylinder-number and the head-number in the DASD is stored in the second cache memory 25 (the nonvolatile memory) in step 13. This step 13 is carried out based on the information stored in the memory 33 in the above step 3'. When the result obtained in step 13 is NO, the central control unit 21 rewrites both the data at the identified position in the DASD and the data which has been correspondingly stored in the first cache memory 24, in step 14. When step 14 has been completed, the process in accordance with the write instruction from the host computer 10 is completed. On the other hand, when the result obtained in step 13 is YES, both the identified data stored in the second cache memory 25 and the data which is correspondingly stored in the first cache memory 24 are rewritten in step 15. Then the process for rewriting the data stored in the cache storage unit is completed. Five seconds after the completion of step 15, the data on the track in which the record corresponding to the identified position exists is read out from the second cache memory 25 and written in the DASD, in step 16. When step 16 is completed, the process in accordance with the write instruction from the host computer 10 is completed.

The above processes are carried out in a case where the DASD is normal. When one of the above cases (1) through (4) where the data is not capable of being written in the DASD occurs at a position X between the step 15 and step 16 in the flow chart shown in FIG. 7, the process proceeds to that shown in FIG. 8.

In the case where the DASD is not capable of being activated, the central control unit 21 fails to write in the DASD the data which has been stored in the second cache memory 25 (the nonvolatile memory). That is, referring to FIG. 8, the central control unit 21 determines that the DASD is not in a ready state, in step 20. Then the central control unit 21 stores the device-number identifying the DASD in which the data should be written, the cylinder-number and the head number in the memory 31, in step 21. In this state, when the DASD is accessed by an OS (Operating system) of the host computer 10, the central control unit 21 sets in a register information for informing to the OS that the DASD is in a busy state, in step 21. After that, the central control unit 3 carries out other processes, in step 23', such as a process for accessing another DASD in accordance with an instruction from the other host computer 11 and a process for controlling the cache storage unit, by determining, in step 23, whether or not there is an interrupt requirement supplied from the DASD which is in the ready state. When the DASD returns to the ready state, a ready signal indicating that the DASD is in the ready state in which the data can be written in the DASD is supplied from the DASD to the file controller 12. Then, the interrupt requirement based on the ready signal is supplied to the central control unit 21. When the central control unit 21 detects the interrupt requirement in step 23, the central control unit 21 determines whether or not the device-number, the cylinder-number and the head-number which have been stored in the register provided therein are respectively equal to corresponding numbers supplied with the interrupt requirement from the DASD, in step 24. When the device-number, the cylinder-number and the head-number stored in the register in the central control unit 21 are equal to the corresponding numbers supplied from the DASD, the data which has been maintained in the second cache memory 25 is written in the DASD which carried out the interrupt requirement, in step 25. Then the central control unit 21 informs the OS of the host computer 10 that the busy state of the DASD is over, and resets the register to inform the OS that the DASD is in the busy state, in step 26. After that, the process is completed.

In a case where a power supply of the data processing system is cut off in a state where the data which should be written in the DASD is stored in the second cache memory 25 (the nonvolatile memory), the data is maintained in the second cache memory 25. In this state, when the power supply of the data processing system is restored, the file controller 12 immediately accesses the DASD to write the data stored in the second cache memory 25. However, as the DASD is mechanically initialized, when the power supply of the data system is restored, the DASD cannot be immediately restored. In this case, thus, the central control unit 21 carries out the other processes while waiting for the interrupt requirement from the DASD. Then the process is carried out in accordance with the flow chart shown in FIG. 8. That is, when the interrupt requirement based on the ready signal is supplied from the DASD, the data which is maintained in the second cache memory 25 is written in the DASD, in the same manner as that described above.

The present invention is not limited to the aforementioned embodiments, and variations and modifications may be made without departing from the scope of the claimed invention.

What is claimed is:

1. A control system for controlling a cache storage unit including a non-volatile memory, said cache storage unit being included in a data processing system having a host computer and an auxiliary storage unit, said control system comprising:

first writing means for writing updated data in said non-volatile memory in response to an instruction from said host computer;

determining means for determining a not ready state of said auxiliary storage unit in which said updated data can not be stored in said auxiliary storage unit based on not receiving a ready response from said auxiliary storage unit;

detecting means for detecting a resumption notification from said auxiliary storage unit indicating resumption of a ready state of said auxiliary storage unit after said determining means has previously determined the not ready state of said auxiliary storage unit; and second writing means, for controlling said cache storage unit to temporarily reserve writing into said auxiliary storage unit the updated data from said non-volatile memory when said determining means determined the not ready state of said auxiliary storage unit and to rewrite into said auxiliary storage the updated data from said non-volatile storage when said detecting means detects said resumption notification from said auxiliary storage unit.

2. A control system as claimed in claim 1, wherein said cache storage unit includes a volatile memory, and wherein said first writing means also writes said updated data in said volatile memory.

3. A control system as claimed in claim 1, wherein said determining means has means for determining the not ready state of said auxiliary storage unit by transmitting an inquiry signal to said auxiliary storage unit and not receiving said ready response from said auxiliary storage unit.

4. A control system as claimed in claim 3, wherein said auxiliary storage unit includes means for generating an interrupt requirement as said resumption notification, and wherein said detecting means has means for detecting said interrupt requirement.

5. A control system as claimed in claim 1 further comprising storage means for storing device information pertaining to said auxiliary storage unit when said determining means determines the not ready state of said auxiliary storage unit.

6. A control system as claimed in claim 5 wherein said device information includes a device-number identifying said auxiliary storage unit and position data identifying a position at which the updated data is to be stored in said auxiliary storage unit.

7. A control system as claimed in claim 5, wherein said determining means has means for determining the not ready state of said auxiliary storage unit by transmitting an inquiry signal to said auxiliary storage unit and not receiving said ready response containing identifying information from said auxiliary storage unit in the ready state, wherein said auxiliary storage unit includes means for generating an interrupt requirement as said resumption notification of said ready state and for supplying information identifying said auxiliary storage unit, and wherein said detecting means has first means for detecting said interrupt requirement and second means for determining whether said information identifying said auxiliary storage unit is the same as identifying information contained in said device information.

8. A control system as claimed in claim 1 further comprising response means for informing said host computer that said auxiliary storage unit is in a busy state when said determining means determines that said auxiliary storage unit is in the not ready state.

9. A control system as claimed in claim 8, wherein said response means has a register for receiving busy state information to indicate to said host computer that said auxiliary storage unit is in the busy state.

10. A control system as claimed in claim 9 further comprising means for resetting the register after said second writing means completely writes the updated data in said auxiliary storage unit.

11. A control system as claimed in claim 8 further comprising means for informing the host computer of cessation of said busy state of said auxiliary storage device once said second writing means completely writes the updated data in said auxiliary storage unit.

12. A data processing system, comprising:
a host computer providing updated data;
an auxiliary storage unit storing the updated data and generating a resumption notification when said auxiliary storage unit recovers from a not ready state; and
a file controller connected between said host computer and said auxiliary storage unit controlling data transfer between said host computer and said auxiliary storage unit; said file controller including:
a non-volatile cache memory;
a cache control unit writing the updated data into the non-volatile cache memory and transferring the updated data from the non-volatile cache memory to said auxiliary storage unit; and
a central control unit determining the not ready state of said auxiliary storage unit by not receiving a ready response from said auxiliary storage unit, and when said central control unit determines the not ready state of said auxiliary storage unit, said central control unit stores device information on the auxiliary storage unit and an address of the updated data, controls said cache control unit to temporarily reserve the transferring of the updated data from the non-volatile cache memory to said auxiliary storage unit, and controls said cache control unit to resume the transferring of the updated data from the non-volatile cache memory to said auxiliary storage unit when said central control unit receives the resumption notification and identifies a correspondence between device information included in the resumption notification with the device information stored by said central control unit.

13. A data processing system as recited in claim 12, wherein said file controller further includes a device adapter which is controlled by said central control unit to transmit an inquiry signal to said auxiliary storage unit; and
wherein said central control unit determines the not ready state by not receiving the ready response from said auxiliary storage unit in response to the inquiry signal.

14. A data processing system as recited in claim 12, wherein said auxiliary storage unit generates an interrupt requirement as the resumption notification when said auxiliary storage unit recovers from the not ready state.

15. A data processing system as recited in claim 12, wherein the device information stored by said central control unit and the device information included in the resumption notification includes a device-number identifying said auxiliary storage unit and position data identifying a position at which the updated data is to be stored in said auxiliary storage unit.

16. A control system in a data processing system with a host computer, a cache with non-volatile memory, and an auxiliary storage unit, said control system comprising:
means for writing updated data in the non-volatile memory in response to an instruction from the host computer;
determining means for determining a not ready state of the auxiliary storage unit;
storing means for storing device information on the auxiliary storage unit and an address of the updated data when said determining means determines the not ready state of the auxiliary storage unit;
means for temporarily reserving a rewriting operation to rewrite the updated data in the non-volatile memory to the auxiliary storage unit when said determining means determines the not ready state of the auxiliary storage unit;
means for generating an interrupt when the auxiliary storage unit is restored into a ready state after the not ready state;
comparing means for comparing a correspondence between device information included in the interrupt with the device information stored by said storing means; and
means for resuming the rewriting operation when said comparing means identifies the correspondence between device information included in the interrupt with the device information stored by said storing means.

17. A method for controlling a data processing system with a host computer, a cache with non-volatile memory, and an auxiliary storage unit, said method comprising:
writing updated data in the non-volatile memory in response to an instruction from the host computer;
determining a not ready state of the auxiliary storage unit;
storing device information on the auxiliary storage unit and an address of the updated data when said determining step determines the not ready state of the auxiliary storage unit;
temporarily reserving a rewriting operation to rewrite the updated data in the non-volatile memory to the auxiliary storage unit when said determining step determines the not ready state of the auxiliary storage unit;
generating an interrupt when the auxiliary storage unit is restored into a ready state after the not ready state;
comparing a correspondence between device information included in the interrupt with the device information stored by said storing step; and
resuming the rewriting operation when said comparing step identifies the correspondence between device information included in the interrupt with the device information stored by said storing step.

* * * * *